United States Patent
Roeser et al.

[11] 3,892,536
[45] July 1, 1975

[54] APPARATUS FOR THE PURIFICATION OF WASTE GASES FROM INTERNAL COMBUSTION ENGINES

[75] Inventors: Helmut Roeser, Frankfurt; Herbert Völker, Wolfgang; Hans-Dieter Brand, Hanau, all of Germany

[73] Assignee: Decatox, GmbH, Frankfurt, Germany

[22] Filed: Nov. 26, 1973

[21] Appl. No.: 419,098

[30] Foreign Application Priority Data
Nov. 27, 1972 Germany................. 2257968

[52] U.S. Cl....... 23/288 F; 23/288 FB; 23/288 FC; 55/387
[51] Int. Cl....... F01n 3/14; B01d 46/30; B01j 9/04
[58] Field of Search........ 23/288 F; 60/297; 55/316, 55/387; 267/150, 160

[56] References Cited
UNITED STATES PATENTS

| | | | |
|---|---|---|---|
| 3,024,593 | 3/1962 | Houdry.................. | 23/288 F |
| 3,150,922 | 9/1964 | Ashley.................. | 23/288 F X |
| 3,429,656 | 2/1969 | Taylor et al............. | 23/288 F X |
| 3,434,806 | 3/1969 | De Rycke et al......... | 23/288 F |
| 3,503,714 | 3/1970 | Lang..................... | 23/288 F |
| 3,556,735 | 1/1971 | Epelman................. | 23/288 F |
| 3,597,165 | 8/1971 | Keith et al.............. | 23/288 F |
| 3,648,999 | 3/1972 | Bauer.................... | 267/160 |
| 3,706,535 | 12/1972 | Taylor et al............. | 23/288 F X |
| 3,775,064 | 11/1973 | Berger et al............. | 23/288 F |
| 3,786,635 | 1/1974 | Kates et al.............. | 60/297 X |

Primary Examiner—Barry S. Richman
Assistant Examiner—Michael S. Marcus
Attorney, Agent, or Firm—Cushman, Darby & Cushman

[57] ABSTRACT

Apparatus for purification of waste gases from internal combustion engines, especially diesel engines, comprising a first housing provided with at least one gas inlet and a separating sump, a second housing connected therewith for gas flow and having at least one gas outlet, a gas buffering first casement loaded with packing traversing the flow cross-section of the first housing, a second casement occupying the flow cross-section of the second housing providing at least one flow channel for receiving a catalyst, the wall of the second casement in a given case being longitudinally tapered or the casement being of diverging-converging cross-section as well as a vibration damping and heat damping insulation enclosing said wall and connected therewith, and arranged at the juncture between the first and second housings, annulum or frame shaped flat springs fixed to the periphery of a casement as suspension and lying thereagainst.

13 Claims, 7 Drawing Figures

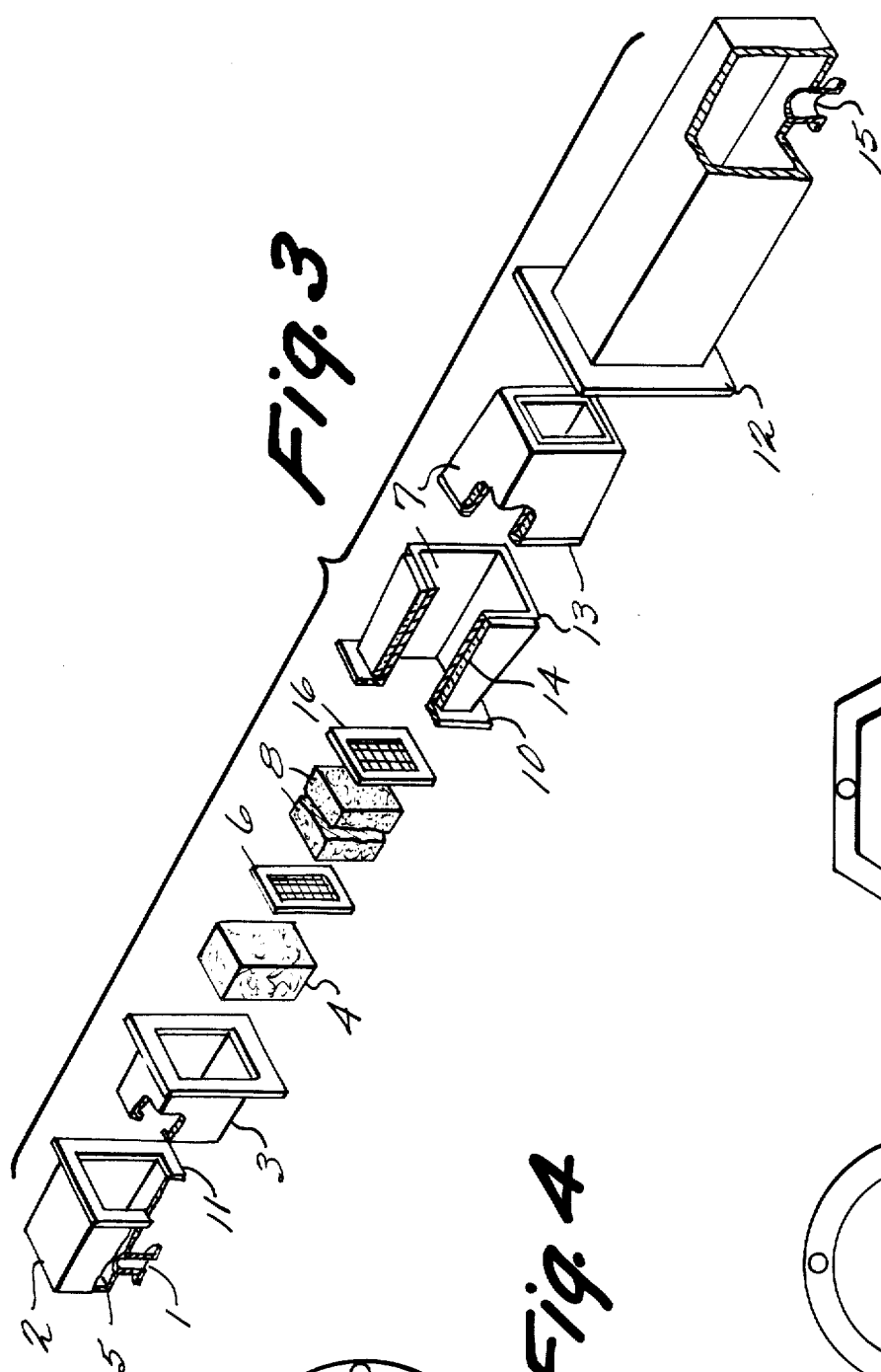

APPARATUS FOR THE PURIFICATION OF WASTE GASES FROM INTERNAL COMBUSTION ENGINES

The invention relates to an apparatus for the cleaning of exhaust gases of internal combustion engines, especially diesel engines of motor vehicles and of stationary installations.

The increasing pollution of the environment requires in an increasing measure the cleaning of exhaust gases of internal combustion engines of biologically and physically harmful components. It is known to oxidize combustible exhaust gas components on a catalyst in the presence of oxygen containing gases into harmless consequent products. At the same time the catalyst is disposed in a housing, through which the gas that is to be purified flows. Internal combustion engines do not deliver their exhaust gas in an even stream but at intervals. As a result of that a catalyst unit, connected in series after the engine, is acted upon by a pulsating exhaust gas, as a result of which a bulk catalyst or also a monolithic catalyst system can be destroyed. In the case of motor vehicles additional vibrating forces have an effect beside the above mentioned vibrations, which forces have not been absorbed by the spring suspension. Another difficulty occurring in the case of the catalytic cleaning or purification of the exhaust gases of internal combustion engines is that the engines discharge larger quantities of soot and unburned fuel in the starting phase, as a result of which the surface of the catalyst is fouled and is thus made ineffective temporarily. This effect occurs with particular strength during a cold start of diesel engines.

Therefore the invention is based on the task of providing an apparatus, which prolongs the useful life of the catalyst by cushioning the harmful vibrations and especially in the case of diesel engines prevents the temporary phase inactivation of the catalyst surface connected with the cold start phase.

The object of the invention is to provide an apparatus, which is characterized by a first housing provided with at least one gas inlet opening and a separating sump, a second housing connected with the first, through which the gases can flow, and provided with at least one gas exit opening, a first gas buffering casement (i.e., a cassette or box) filled with packing and occupying at least the cross section of flow of the first housing, a second casement occupying the cross sectional flow of the second housing and having at least one flow channel for the reception of a catalyst, the wall of said second casement being developed in a given case with a longitudinal taper, e.g., as a frusto single cone or with a diverging-converging cross section, e.g., as a frusto multiple cone, as well as a vibration damping and heat damping insulation connected with and enveloping said wall and annular or frame-shaped flat springs covering the insulation and disposed at the juncture between the first and second housings and facing the casement and connected on the periphery of the casement and serving each time as a suspension system for the casement.

Thus, the idea of the invention consists in the fact of stabilizing the pulsating exhaust gases in an antechamber and in the cold phase to absorb particles of carbon black as well as condensing components of the exhaust gases as well as arranging the catalyst unit in an oscillation or vibration dampened suspension. The components of the exhaust gas collected in the cold phase in the antechamber are transferred gradually with increased heating into the catalyst space and there are rendered harmless. The conveyance of the separated carbon black is effected at the same time by the warm exhaust gas and the evaporating condensate.

The two casements have openings or gas permeable front walls in the direction of flow of the exhaust gas, so that a straight path for the gas will result from the gas inlet to the gas outlet.

The apparatus according to the invention can be made separable in order to facilitate the cleaning and exchange of the catalyst charge. For this purpose according to an advantageous embodiment of the invention, the two housings are connected separably with one another by means of flanges.

The two adjacent flat springs serving as suspension for the casements are clamped or attached between the flanges of the two housings in accordance with a preferred form of the invention; the flat springs, depending on the selected cross section of the apparatus, are made annularly or frame-shaped and thus limit the openings for the passage of the gas between the first and the second housing. A particularly compact arrangement will result whenever the front walls of the casements constitute one workpiece with the flat spring. This can be achieved through welding the front walls together with the flat spring.

For the shape of the housings and the casements any desired cross section can be selected. For reasons of production, however, a cylindrical, rectangular, oval or hexagonal cross section is preferred.

The first casement formed as a buffer zone contains inserts, which will buffer the thrusts of the gas, for example packing such as steel wool or metal helixes.

According to a suitable construction of the apparatus according to the invention, the gas buffering substance and the catalyst are disposed between perforated plates. The latter can be developed as orifice plate sevage blocks or as sieves. The perforated plates bounding the catalyst are of importance above all in the case of the use of bulk catalysts. In order to avoid an excessive abrasion as a result of the action of vibrations and reverberations, above all in the case of use of bulk catalysts, the catalyst casement can be bounded by slidable perforated plates, on which from the outside a sliding mechanism known per se acts, for example a push rod, operated in a given case pneumatically or hydraulically for the elimination of dead space.

Finally, a favorable further development of the idea of the invention consists in the fact of decreasing the separation of components of the exhaust gas in the buffer casement by preheating the exhaust gases which flow into said buffer casement and to promote the achievement of the starting temperature of the catalyst. For this purpose, the first housing can be surrounded by a heating jacket or an unencumbered heating element, for example an electrically supplied heating rod, a heating coil or a heating grid can be arranged in its inside space.

The invention will be understood best in connection with the drawings which show the invention in connection with a diesel engine.

FIG. 3 is an exploded view of FIG. 1;

FIG. 4 is an end view of a modified form of the invention wherein the housings and casements are cylindrical in cross-section;

FIG. 5 is a view similar to FIG. 4 wherein the housings and casements are oval in cross-section; and FIG. 6 is still another modification similar to FIG. 4 but utilizing housings and casements with a hexagonal configuration.

Figure 1A:
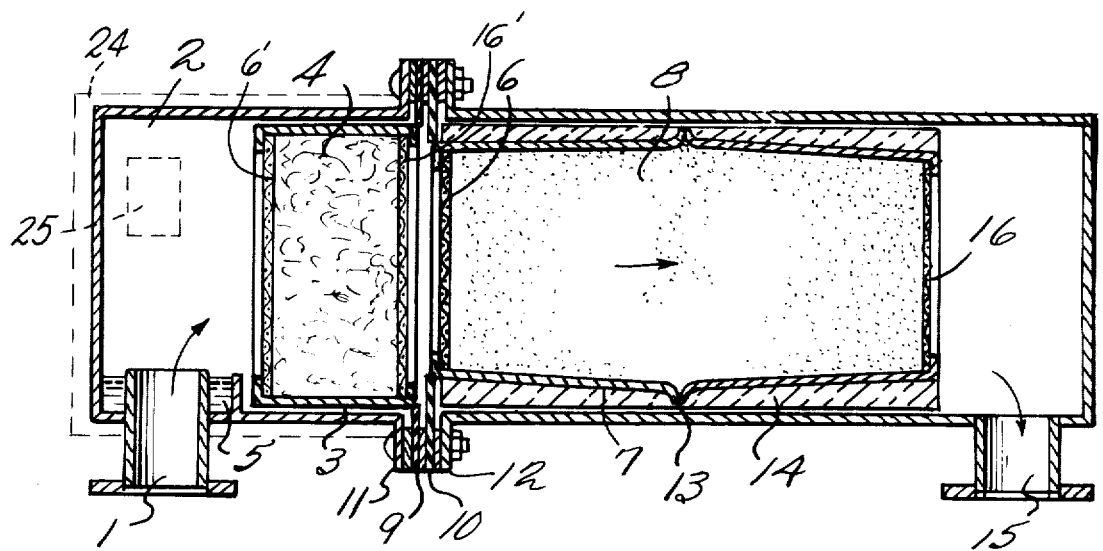
FIG. 1a is a sectional view through one embodiment of the apparatus according to the invention.

Referring more specifically to FIG. 1a of the drawings in starting the engine, the cold carbon black containing exhaust gases enter through the gas inlet opening 1 into the housing 2 of the apparatus. They then flow into the buffer casement (or cassette) 3, which is filled with steel wool or packing 4 with a large surface area. In this way, the water, the carbon black and the hydrocarbons in the exhaust gas are deposited or condensed. In case that larger quantities of the condensate are obtained, the latter can collect in sump 5. The precleaned and stabilized gases after leaving the buffer zone flow through the catalyst casement (or cassette) 7 provided with perforated front and rear walls 6, and 16 (e.g., screens). Screens 6' and 16' may also be provided to retain the buffering material 4 within the buffer casement 3. CO and the remaining hydrocarbons are converted in the casement at the reaction temperature on the catalyst 8 into $CO_2$ and $H_2O$. The hydrocarbons accumulated in the sump and in the buffer zone, as well as the carbon black and the water, after heating of the engine to operating temperature are vaporized or carried out by the hot exhaust gases and carbon black and hydrocarbons are then oxidized on the catalyst.

The buffer casement 3 at its front side facing the catalyst casement carries a spring frame 9 welded together with the material of the casement; the catalyst casement 7 likewise carries on its front side facing the buffer casement a corresponding spring frame 10. The springs 9 and 10 at their edge are clamped down firmly on the periphery between the two flanges 11 and 12 of the buffer or catalyst housing, and they hold the two casements in their housing swingably. The catalyst casement 7 has been developed as a frusto double cone of diverging-converging cross-section and consists of two halves connected rigidly with one another by way of a scarf joint 13. The jacket of the catalyst casement covered with a heat and vibration damping insulation 14; its thickness is dimensioned at least in such a way that in case of swinging of the catalyst casement, the insulating jacket comes into contact with the walls of the housing; it is best to fit in the insulated casement without clearance into its housing. The vibration damping jacket is deformed by pressure during swinging (or oscillating) of the casement (see FIG. 2) as a result of which vibration energy is consumed and thus the vibration is dampened. The cleaned gases exit through the opening 15.

Figure 2:
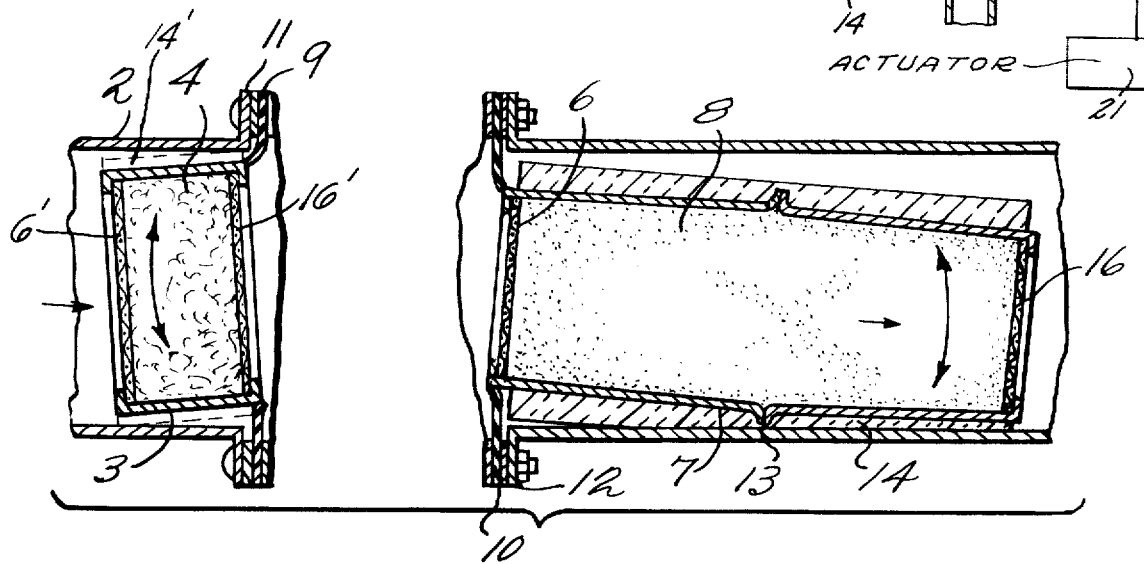
FIG. 2 is a schematic illustration of the function and of the vibration damping for the two casements.

The buffer casement, which likewise has been suspended swingably, in most cases requires no vibration damping jacket; insofar, however, as a vibration sensitivity gas buffering filling is used, its jacket can be developed exactly as that of the catalyst casement (shown in dotted line at 14' in FIG. 2).

Figure 1B:
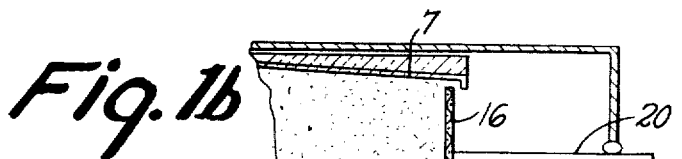
FIG. 1b is a sectional view through a portion of a modified form of the present invention.

As indicated supra the catalyst casement can be provided with a slidable perforated plate to eliminate dead space. Such a slidable plate 16 is shown in FIG. 1b, controlled by a sliding mechanism such as rod 20, actuated by any suitable actuating means, shown diagrammatically as actuator 21. Also, if preheating of the gas before flowing into the catalyst casement is desired, suitable heating means — such as heated jacket 24, shown in dotted line in FIG. 1a, or interior heating coil, grid, or the like, shown at 25 in FIG. 1a — may be provided in conjunction with the housing sector (2) surrounding buffer casement 3.

We claim:

1. Apparatus for the purification of exhaust gases from internal combustion engines comprising
   a. a first housing structure having interior walls and a gas inlet, the downstream end wall of said first housing being open and adapted for connection to a second housing structure,
   b. a second housing structure having an open upstream end wall and being adapted to be connected to said first housing structure for gas flow therebetween and having interior walls and a gas outlet,
   c. means connecting said first housing downstream end wall to said second housing upstream end wall with means providing a gas-tight communication therebetween,
   d. means for providing for oxidation of combustible exhaust gas components, said means comprising a casement member disposed within said second housing structure, said casement member containing a catalyst and providing a flow channel for gases,
   e. means for prolonging the useful life of catalyst within said casement member and minimizing the chances of untreated gases passing through said apparatus by minimizing the introduction of soot, water vapor, and unburned hydrocarbons during startup and by buffering gas thrusts, said means including a buffer casement having buffering means contained therein disposed within said first housing structure and providing a path through which gases must pass before entering said casement member, and
   f. means for preventing damage to catalyst contained within said casement member due to vibration, said means including (i) means for mounting said casement member for oscillation about a pivot, said means including flat spring means mounted to the upstream end wall of said second housing structure, and (ii) a vibration damping and heat insulating jacket surrounding said casement member thereby being disposed between said casement member and the interior walls of said second housing structure.

2. Apparatus as recited in claim 1 further comprising a sump formed in said first housing structure located at the bottom of said apparatus and surrounding said gas inlet.

3. Apparatus as recited in claim 1 wherein said casement member and said buffer casement each contain front and rear perforated plates for containing and retaining said catalyst and said buffering means respectively therebetween.

4. Apparatus as recited in claim 1 further comprising means for containing and retaining said catalyst within said casement member, said means including a slidable perforated plate disposed at one end of said casement member, and means for sliding said slidable plate.

5. Apparatus as recited in claim 1 wherein said buffering means in said buffer casement includes steel wool.

6. Apparatus as recited in claim 1 wherein said flat spring means includes an annular flat member of spring material.

7. Apparatus as recited in claim 1 wherein said casement member has a multiple taper longitudinally, and is of diverging-converging cross-section.

8. Apparatus as recited in claim 1 further comprising a heating jacket surrounding said first housing structure.

9. Apparatus as recited in claim 1 further comprising means for preventing damage to buffering means contained within said buffer casement due to vibration, said means including means for mounting said buffer casement for oscillation about a pivot including flat spring means mounted to the downstream end wall of said first housing structure.

10. Apparatus as recited in claim 9 wherein said means for preventing damage to said buffering means further comprises a vibration damping and heat insulating jacket surrounding said buffer casement thereby being disposed between said buffer casement and the interior walls of said housing structure.

11. Apparatus as recited in claim 9 wherein said means connecting said downstream end wall of said first housing structure to said upstream end wall of said second housing structure includes readily detachable means securing said flat spring means of said buffer casement and said casement member together.

12. Apparatus as recited in claim 11 further including means for fixedly connecting each of said flat spring means to the downstream end wall of said first housing structure and to the upstream end wall of said second housing structure respectively.

13. Apparatus as recited in claim 11 wherein said means connecting the downstream end wall of said first housing structure to the upstream end wall of said second housing structure further includes external flanges formed on said first and second housing structures respectively.

* * * * *